UNITED STATES PATENT OFFICE.

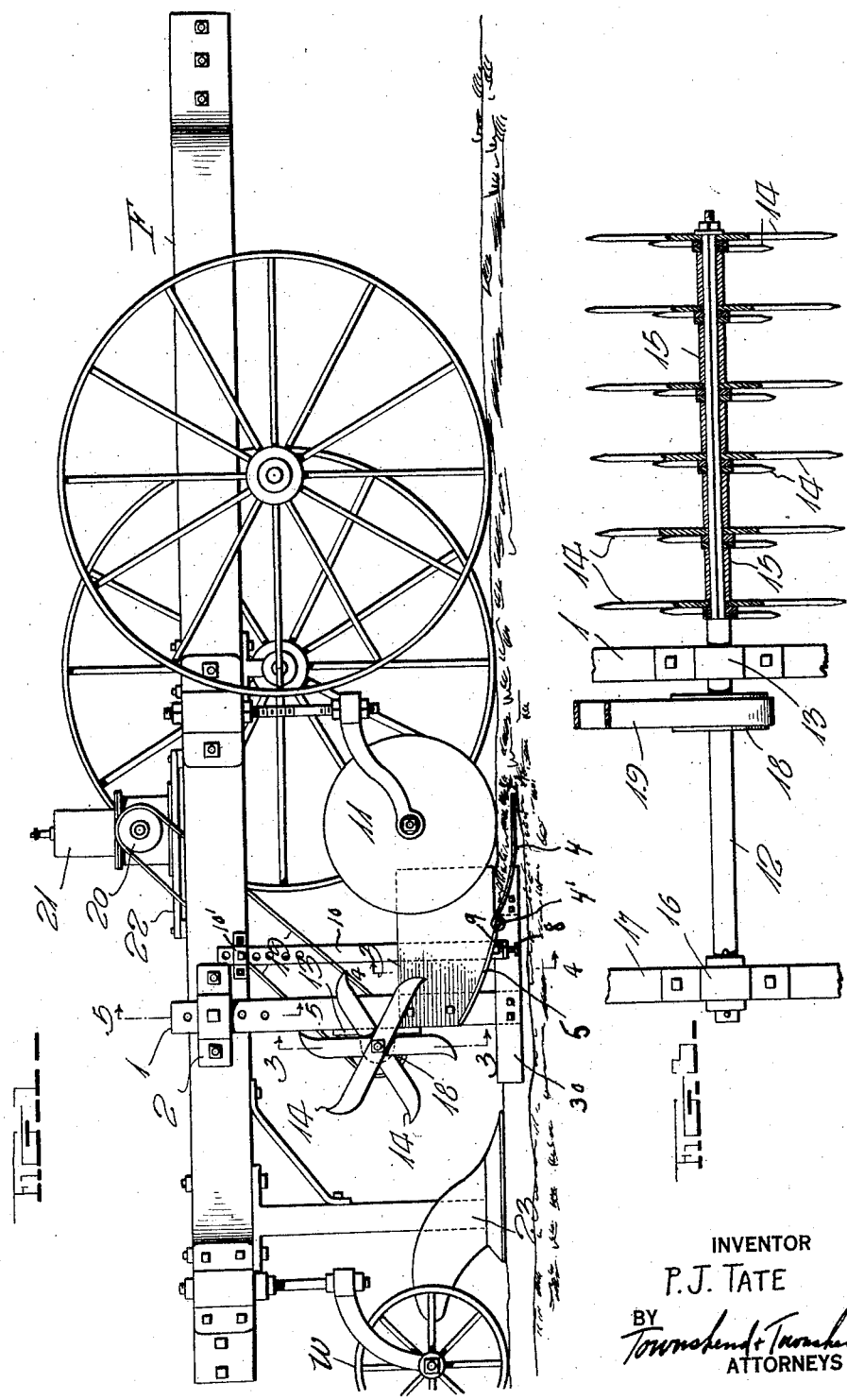

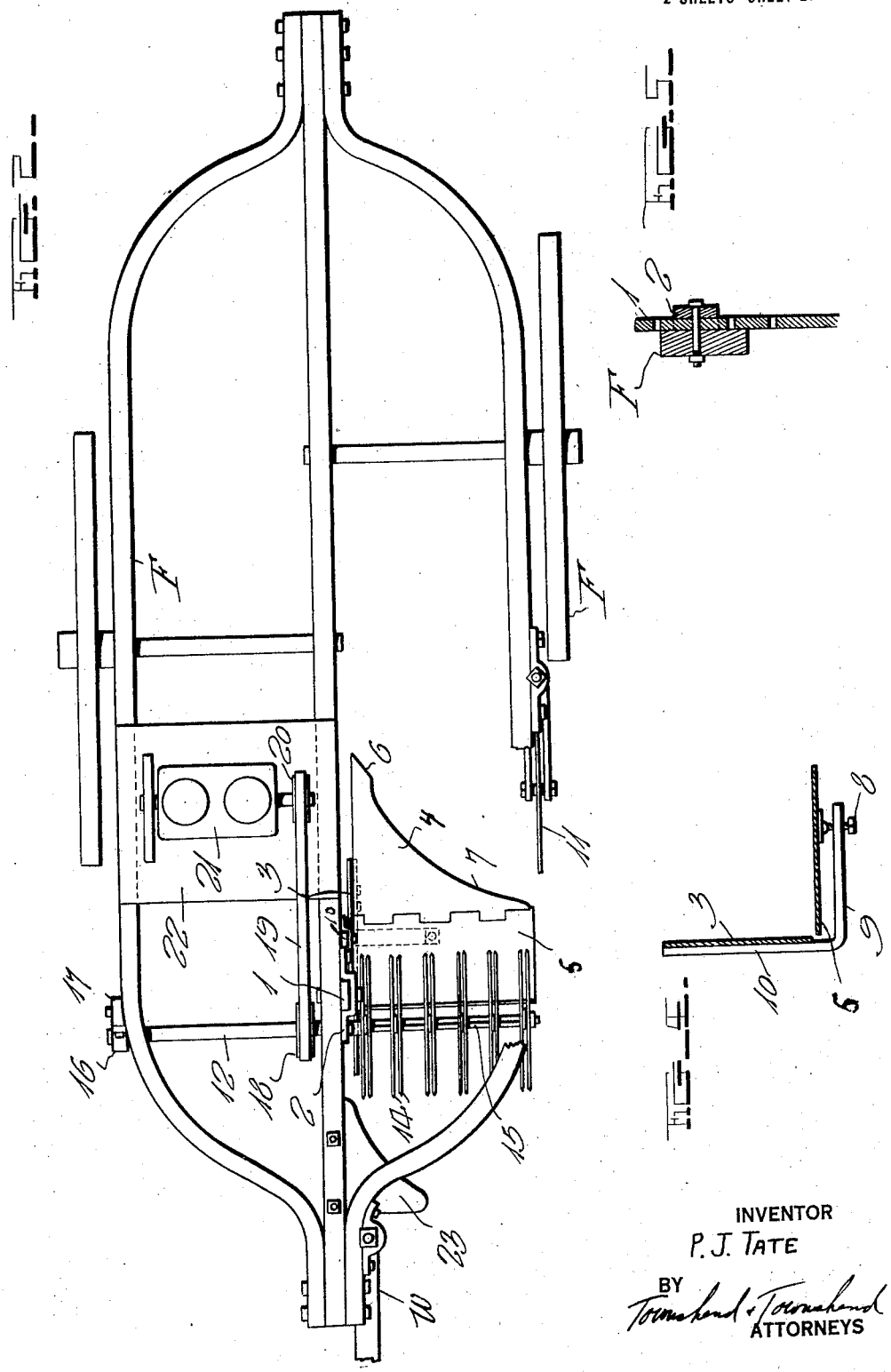

PERL J. TATE, OF BIG PINE, CALIFORNIA.

PLOW AND PULVERIZER.

1,395,370.	Specification of Letters Patent.	Patented Nov. 1, 1921.

Application filed July 20, 1920. Serial No. 397,671.

*To all whom it may concern:*

Be it known that I, PERL J. TATE, citizen of the United States, residing at the town of Big Pine, in the county of Inyo and State of California, have invented certain new and useful Improvements in Plows and Pulverizers, of which the following is a specification.

My invention relates to agricultural implements, particularly to that class of such implements which includes plows and analogous earth working elements.

The primary object of the invention is the provision of a device in which various earth working elements are so correlated and disposed as to combine into the ensemble, a machine by which the ground to be work, is plowed, disked and harrowed, in the one operation.

An additional object is the provision of mechanism by which the earth is delivered from a plow to beaters without being twisted or turned in any way.

A further object is the provision of such a device in which the earth after passing the beaters is delivered in normal position, directly in rear of the plow share.

A still further object is the provision of novel plowing means and a novel arrangement of beater mechanism.

With these and such other objects in view as will be apparent from the description, my invention resides in the novel construction, combination and arrangement of parts, illustrated and described in connection with the accompanying drawings, in which:

Figure 1, is a side elevation of the preferred form of my invention,

Fig. 2, a top plan view thereof,

Fig. 3, a transverse vertical section on the line 3—3 of Fig. 1,

Fig. 4, a similar sectional view on the line 4—4 of Fig. 1,

Fig. 5, a similar sectional view on the line 5—5 of Fig. 1.

Briefly described, the invention comprises a sulky plow frame having mounted at one side thereof, rotatable beater blades driven from a suitable power source located at the opposite side of the frame. A plow member is disposed below and in advance of the beaters, with a hinged portion suitably arranged for regulating the amount of earth delivered to the beaters, the depth of the furrow being regulated by the frame in the usual manner. The plow member and its hinged portion are flat bottomed, curving slightly upward to the beaters, whereby the earth will be delivered to the beaters without being twisted or turned in any manner.

In detail, I provide in a sulky plow frame of suitable design, indicated by F, a depending brace beam 1, adjacent the rear of the frame and suitably secured to the frame by a strap 2, arranged for vertical adjustment. Secured on the beam and extending forwardly of the frame, is a substantially rectangular, vertical, plane cutter member 3, and bolted, or otherwise secured to the lower end of beam 1, is a longitudinally extending landside member 30, extending rearwardly of the beam and forwardly thereof under the cutter 3.

On the front end of the landside 30, is secured a plow share 4, extending laterally thereof and having a flat bottom with its rear edge terminating in a hinge 4', the bottom curving slightly upward thereto. Mounted on the rear edge of the plow share 4, by means of the hinge 4', is a flat bottomed, laterally extending, rectangular mold board 5 for delivery of earth to beaters hereinafter described.

The share 4 is provided adjacent the cutter 3, with a forwardly extending entrance arm 6 and having a rearwardly curved cutting edge 7, extending to the outer side thereof. The mold board 5 is vertically adjustable by means of a regulating screw 8 carried beneath the board in the end of an arm 9, extending laterally from an upright 10, suitably secured to the frame by means of a strap 10' for vertical adjustment if desired.

Mounted for vertical adjustment on one of the beams of the frame, and disposed at the opposite side of the plow from the cutter 3, is a rolling disk or colter 11, adapted to run parallel to the stationary cutter 3 and slightly in advance thereof.

Member 3, colter 11, share 4 and mold board 5, comprise the plowing means for cutting and raising the sod and earth. The mechanism for beating and pulverizing, comprises a transversely disposed shaft 12, journaled in a bearing 13 mounted on the rear edge of the beam 1, one end of the shaft being squared and extending laterally of the frame over the rear edge of the mold board 5, slightly in rear thereof and spaced thereabove. At spaced intervals on the squared end of shaft 12, groups of beater blades 14 are rigidly mounted and are held in spaced relation by means of spacing sleeves 15. The opposite end of the shaft is journaled in a bearing 16 carried by a beam 17 depending from the frame. Suitably secured to the shaft at any desired point between the beams 1 and 17, is a drive pulley 18, adapted to receive thereover a belt 19 disposed over a drive pulley 20 actuated from a suitable power source 21, which in this instance comprises a motor arranged on a platform 22 supported in the frame on the side opposite the earth working mechanism.

The beater blades are disposed above the rear edge of the mold board 5 and act to pulverize earth delivered upwardly thereto by the mold board, from which the earth is deposited directly in rear of the plow, the action of the beater being such as to perform the function of disking and harrowing.

Arranged in the frame in advance of the rear wheel W is a furrow clearing member 23, which is adapted to serve as a marker for the succeeding furrow.

In operation, the depth of the furrow being regulated by the frame in the usual manner, earth will be cut and lifted to the beater blades, the amount delivered to the beater being regulated by adjustment of the mold board as described. The colters serve to cut the sod at opposite sides of the plow and in advance thereof.

In this embodiment of my invention I have illustrated the device as adapted to be drawn by draft animals. When it is desired to employ a tractor, the power source in the frame may be dispensed with and suitable operating connection provided between the drive pulleys and the tractor.

While I have described and illustrated certain specific details which enter into the construction and operation of the invention, I desire it to be understood that I do not limit myself to these, but that any such may be employed as will fall within the scope of the invention as claimed.

I claim:—

1. A device of the character described comprising the combination, in a wheeled frame, of a beam depending therefrom, a longitudinally extending landside member carried on the lower end thereof, a plow share rigidly mounted on the said member and extending laterally thereof, a mold board hinged to said share for delivery of earth from said share, colters vertically adjustable disposed at opposite sides of said share, means carried by the frame for vertical adjustment of said mold board, beater mechanism in the frame above the rear edge of said mold board and in alinement therewith, and means for operating said beater mechanism.

2. In a device of the character described, a wheeled frame, a support depending from a beam thereof, a longitudinally disposed cutter blade on said support, a longitudinally extending landside member on the lower end of said support, a plow share secured on the member extending laterally thereof, a mold board hinged to the rear of said share and extending upwardly therefrom, means in the frame for vertical angular adjustment of the mold board, revoluble beater mechanism carried by said support above the rear edge of the mold board, the bottom of said share and mold board being flat for delivery of earth to said beaters without turning, and means for operating said beaters.

3. A device of the character described comprising the combination of a wheeled frame, a vertically adjustable beam depending therefrom, a vertically arranged longitudinally disposed cutter blade carried by said beam adjacent the lower end, a landside member on the lower end of said beam and extending rearwardly thereof, and forwardly thereof under said cutter blade, a substantially flat plow share mounted on the forward end of said landside member and extending laterally thereof, a substantially flat mold board hinged to the rear of said plow share, a bar in said frame, the lower end of said bar being extended laterally beneath said mold board, a member on the lower end of said bar for vertical angular adjustment of the mold board, revoluble beater mechanism carried by said beam rearwardly of and above the mold board, and means in the frame for operating said mechanism.

In testimony whereof I affix my signature.

PERL J. TATE.